(No Model.)

W. N. GARTSIDE.
METALLIC DOWEL PIN FOR PATTERN MAKERS.

No. 573,970. Patented Dec. 29, 1896.

Witnesses
J. M. Fowler Jr.
Thomas Durant

Inventor
William N. Gartside,
By Church & Church
his Attorneys

UNITED STATES PATENT OFFICE.

WILLIAM N. GARTSIDE, OF RICHMOND, INDIANA.

METALLIC DOWEL-PIN FOR PATTERN-MAKERS.

SPECIFICATION forming part of Letters Patent No. 573,970, dated December 29, 1896.

Application filed November 7, 1893. Serial No. 490,278. (No model.)

*To all whom it may concern:*

Be it known that I, WILLIAM N. GARTSIDE, of Richmond, in the county of Wayne and State of Indiana, have invented certain new and useful Improvements in Metallic Dowel-Pins for Pattern-Makers; and I do hereby declare the following to be a full, clear, and exact description of the same, reference being had to the accompanying drawings, forming a part of this specification, and to the letters of reference marked thereon.

This invention relates to dowels especially designed for positioning and retaining in proper relative position the cope and drag of a pattern for molding, although capable of a wider range of usefulness, as will appear more fully from the following description.

The objects of the invention are to provide a simple device which may be easily inserted in an opening formed entirely from one end; and the invention consists in certain novel details of construction and combinations and arrangements of parts, all as will be now described, and pointed out particularly in the appended claim.

Figure 1:
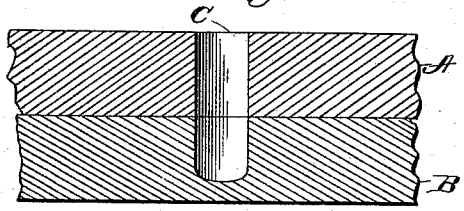
Figure 2:
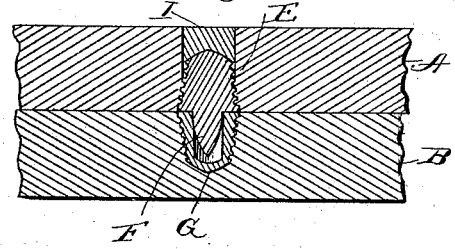
Figure 3:
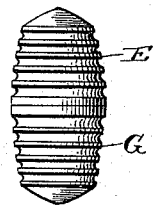
Figure 4:
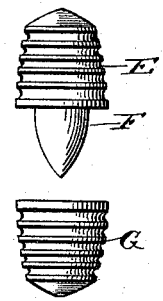

Referring to the accompanying drawings, Figure 1 is a section through a cope and drag, showing an opening therein for the reception of the dowel. Fig. 2 is a similar view with the dowel in place. Fig. 3 is an elevation of the dowel itself. Fig. 4 is a similar view with the halves separated.

Like letters of reference in the several figures denote the same parts.

The letter A indicates the cope, and B the drag, of a pattern, the dowel being especially, though not exclusively, applicable for holding these parts in proper relative position.

In the practical application of the invention the cope and drag are placed together in proper relative position. Then a hole C is bored or otherwise formed way through the cope and into the drag a proper distance to contain the socket of the dowel. This procedure enables the holes to be quickly and accurately formed, so as to register exactly when the cope and drag are brought together properly.

Metallic dowels have been made heretofore, but with the socket portion of much greater diameter than the pin, and hence the openings in the cope and drag for such parts had to be made from the parting and the accurate registration of the parts could not be assured. Hence such dowels are undesirable and require the work of a skilled mechanic to fit them with anything like accuracy. With my present invention, on the other hand, the body of the socket and shank of the pin are made of the same external diameter, and the opening is made of a proper size for both to fit snugly therein. Thus in Figs. 2, 3, and 4 it will be seen that the shank E for the pin F is made of the same external diameter as the socket G, into which the pin fits.

The hole having been formed as first described and as shown in Fig. 1, the pin-shank is seated therein from the parting and a plug or filler I is driven into the upper end of the hole to close the same, and the socket is also driven into place.

Obviously the cross-sectional shape of the hole and dowel is immaterial, but I prefer to have them cylindrical, as shown, and provided with a series of corrugations or annular enlargements or threads to insure the proper retention of the dowel in the wood.

In the preferred form also the reduced pin F is pointed or sharpened somewhat to insure a proper entry into the socket, and the exterior ends of the shank and socket are similarly formed or tapered to insure their proper entry into the holes in the cope and drag.

Other uses for a dowel of this character will at once suggest themselves, and hence I do not wish to be limited to any specific use, it only being essential that the exterior of both the socket and shank of the pin shall be of substantially the same size, thus necessitating the boring or formation of but a single opening in order to fit the dowel accurately in place.

Having thus described my invention, what I claim as new is—

In a two-part structure, the combination with the two parts fitting together, but movable away from each other and having a hole of uniform diameter formed entirely through one and into the other, of a dowel consisting of the two tapering, blunt-ended externallycorrugated body portions driven into said hole with the line of separation at the parting, one of said body portions having a central cylindrical opening in its end face and the other of said body portions having an integral tapering pin formed thereon adapted to fit in the socket in the other body portion when the parts of the structure are brought together; substantially as described.

WILLIAM N. GARTSIDE.

Witnesses:
 HENRY C. STARR,
 HENRY L. LEIBHARDT.